United States Patent [19]
Kobayashi

[11] Patent Number: 5,765,053
[45] Date of Patent: Jun. 9, 1998

[54] RECORDING/REPRODUCING APPARATUS DETECTING A MISRECORDED PORTION

[75] Inventor: Takashi Kobayashi, Tokyo, Japan

[73] Assignee: Canon Kabushiki Kaisha, Tokyo

[21] Appl. No.: 807,768

[22] Filed: Feb. 27, 1997

Related U.S. Application Data

[63] Continuation of Ser. No. 340,410, Nov. 15, 1994, abandoned.

[30] Foreign Application Priority Data

Dec. 2, 1993 [JP] Japan ................................ 5-338791

[51] Int. Cl.$^6$ .............................. H04N 5/923; H04N 5/94
[52] U.S. Cl. ............................ 386/93; 386/47; 386/51
[58] Field of Search ......................... 386/47, 51, 80, 386/86, 87, 93, 85, 113, 114, 115, 9, 13, 21; 348/533, 535, 616; 360/72.3, 73.11; H04N 5/923, 5/96

[56] References Cited

U.S. PATENT DOCUMENTS

| | | | |
|---|---|---|---|
| 4,689,695 | 8/1987 | Urata | 358/314 |
| 4,729,041 | 3/1988 | Kuroda | 358/336 |
| 5,400,188 | 3/1995 | Hirschenberger et al. | 360/72.1 |
| 5,450,255 | 9/1995 | Arisoka | 360/72.1 |

*Primary Examiner*—Robert Chevalier
*Attorney, Agent, or Firm*—Fitzpatrick, Cella, Harper & Scinto

[57] ABSTRACT

A signal, comprising a video signal, an audio signal and the like, is recorded while being frequency modulated, and a signal obtained by frequency demodulating a reproduced signal is subjected to envelope detection. It is thereby possible to detect a blank portion, comprising a black image portion, a silent portion and the like, in the reproduced signal, and therefore to detect an erroneously recorded portion.

23 Claims, 11 Drawing Sheets

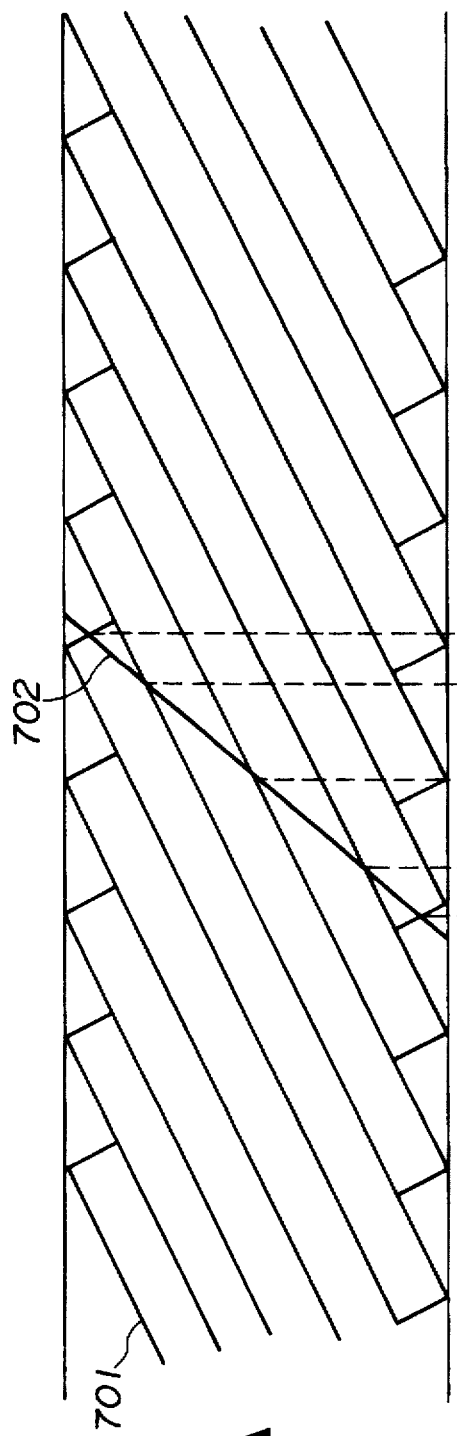
FIG.10A
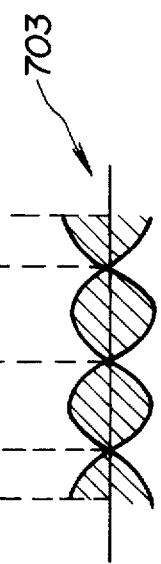
FIG.10B
FIG.10C
FIG.10D

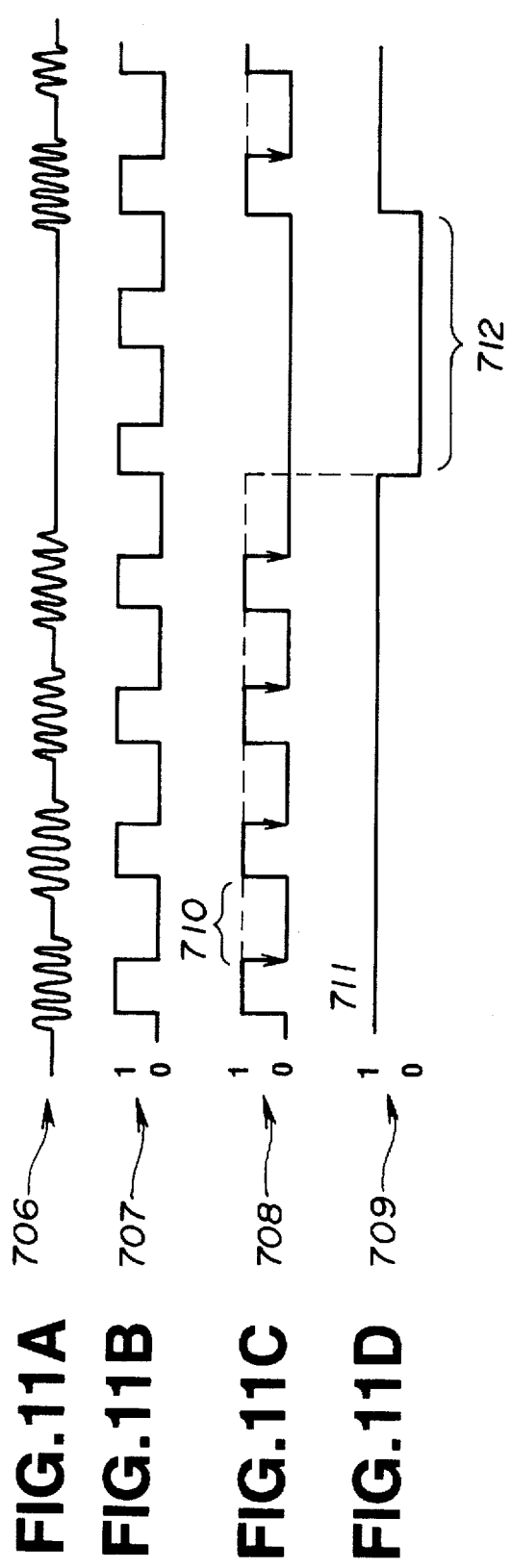

FIG.13B 802 "1" "0"

RECORDING/REPRODUCING APPARATUS DETECTING A MISRECORDED PORTION

This application is a continuation of application Ser. No. 08/340,410, filed Nov. 15, 1994, now abandoned.

BACKGROUND OF THE INVENTION

1. Field of the Invention

This invention relates to a recording/reproducing apparatus, and more particularly, to an apparatus which can detect a portion where a video signal or an audio signal is erroneously recorded.

2. Description of the Related Art

A video cassette recorder (hereinafter termed a "VCR") for recording a video signal and an audio signal on a magnetic tape has been known as a typical example of such an apparatus. In some VCR's, for example, an unrecorded portion on a tape is detected during a reproducing operation and the tape is stopped at that portion, or dropout control (in which a portion where a recorded signal is missing is detected and interpolation or muting is executed for that portion) is performed.

FIG. 1 illustrates the configuration of such a VCR. When recording an audio signal by the apparatus shown in FIG. 1, the audio signal input from an input terminal 101 passes through an AGC (automatic gain control) amplifier 102, and is input to a noise reduction (NR) circuit 103, in which the dynamic range of the signal is compressed, and the resultant signal is transmitted to a frequency modulation circuit 104. The signal is subjected to frequency modulation with a predetermined carrier (for example, having a frequency of 1.5 MHz (megahertz)) by the frequency modulation circuit 104. The resultant signal passes through a band-pass filter (BPF) 105 and a recording amplifier 106, and is recorded on a magnetic tape 108 by a magnetic recording head 107.

When reproducing a recorded signal, the signal output from the magnetic head 107 passes through a reproducing amplifier 109, a BPF 110 and a limiter 111, and is transmitted to a frequency demodulation circuit 112 and to an unrecorded-portion (dropout) detection circuit 113. The dynamic range of an audio signal demodulated into a baseband by the frequency demodulation circuit 112 is expanded by an NR circuit 114, and the resultant signal is output via an output amplifier 115. The unrecorded-portion detection circuit 113 detects unrecorded portions in the signal according to procedures which will be described later, and outputs the result of the detection to a servo control device, a muting device or the like (not shown) as a control signal.

FIG. 2 illustrates an example of the configuration of the unrecorded-portion detection circuit 113.

The unrecorded-portion detection circuit 113, for example, comprises a detector 401 for performing envelope detection of an input signals and a comparator 403 for comparing the input signal with a reference voltage, and the detector 401 is represented, for example, by an equivalent circuit shown in FIG. 3.

The comparator 403 compares the input signal with the reference voltage, and outputs "1" if the input signal is greater than the reference voltage, and outputs "0" if the input singal is smaller than the reference voltage.

If a signal 501 shown in FIG. 4A is input to the detector 401, a detection output signal 502 (indicated by a solid line in FIG. 4B) is obtained. The detection output signal 502 is compared with a reference signal 503 (FIG. 4C) by the comparator 403, where a comparison output signal (detection signal) 504 is obtained (FIG. 4D). A period 505, in which the value of the comparison output signal 504 equals "0", corresponds to an unrecorded or missing portion 506 of the recorded singal. The comparison output signal 504 becomes a control signal for the servo device, the muting device or the like.

In the above-described VCR, however, since an unrecorded or missing portion of the recorded signal is detected using only a reproduced signal before demodulation, it is impossible to detect a portion where a carrier is recorded and an audio signal is not demodulated, i.e., a silent portion.

For example, in the case of a camcorder (a VCR integrated with a camera), suppose that a photographing button has been depressed, for example, by a misoperation of the user, and a silent and black-image portion (which is entirely useless) has been recorded. Even if the user intends to detect the misrecorded portion and resume a photographing operation from that portion, it is impossible to automatically search for that portion during a reproducing operation or a searching operation.

Accordingly, the user must reproduce the recorded video/audio signal and find the silent and black-image portion using a display, a speaker or the like, thereby causing a very troublesome operation.

SUMMARY OF THE INVENTION

It is an object of the present invention to solve the above-described problems.

It is another object of the present invention to provide an apparatus which can detect a misrecorded portion.

According to one aspect of the present invention, a signal reproducing apparatus comprises reproducing means for reproducing a frequency-modulated signal, demodulation means for frequency demodulating the reproduced signal, and detection means for detecting a blank portion in the reproduced signal using a signal output from the demodulation means.

According to another aspect of the present invention, a signal reproducing apparatus comprises reproducing means for reproducing a frequency modulated signal from a recording medium. The reproducing means includes feeding means for feeding the recording medium. The apparatus further comprises demodulation means for frequency demodulating the reproduced signal, detection means for detecting an envelope of a signal output from the demodulation means, and control means for controlling the feeding means in accordance with an output from the detection means.

According to still another aspect of the present invention, a signal reproducing apparatus comprises feeding means for feeding a recording medium, reproducing means for reproducing a modulated signal from the recording medium, demodulation means for demodulating the reproduced signal, detection means for detecting a level of a signal output from the demodulation means, and control means for controlling the feeding means in accordance with an output from the detection means.

The foregoing and other objects, advantages and features of the present invention will become more apparent from the following detailed description of the preferred embodiment taken in conjunction with the accompanying drawings.

BRIEF DESCRIPTION OF THE DRAWINGS

FIGS. 10A–10D illustrate diagrams for explaining the operation of the apparatus shown in FIG. 5;

FIGS. 11A–11D illustrate waveforms for explaining the operation of the apparatus shown in FIG. 5;

FIGS. 13A–13B illustrate waveforms for explaining an image blank detecting operation of the apparatus shown in FIG. 5.

DETAILED DESCRIPTION OF THE PREFERRED EMBODIMENT

A preferred embodiment of the present invention will now be described in detail with reference to the drawings.

Figure 1:
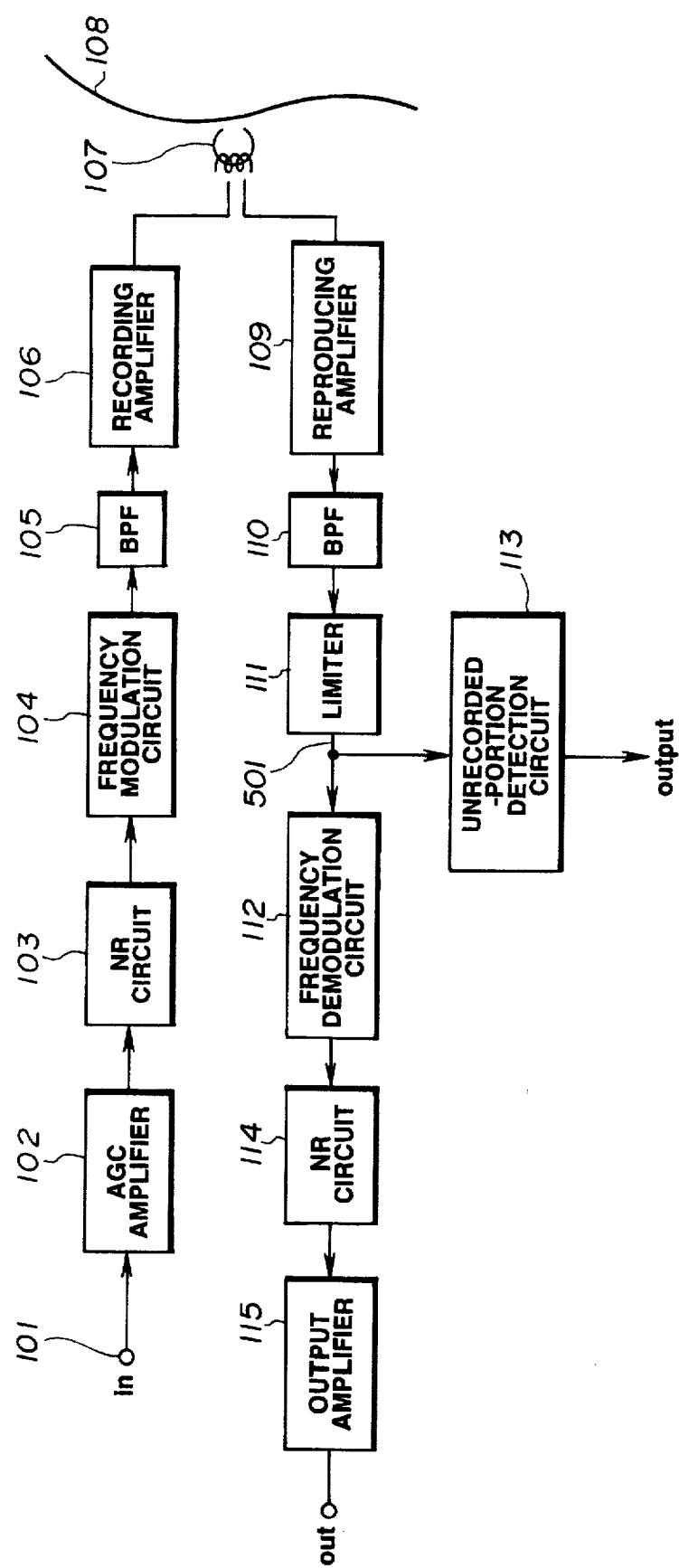
FIG. 1 is a block diagram illustrating the configuration of a conventional VCR.
Figure 2:
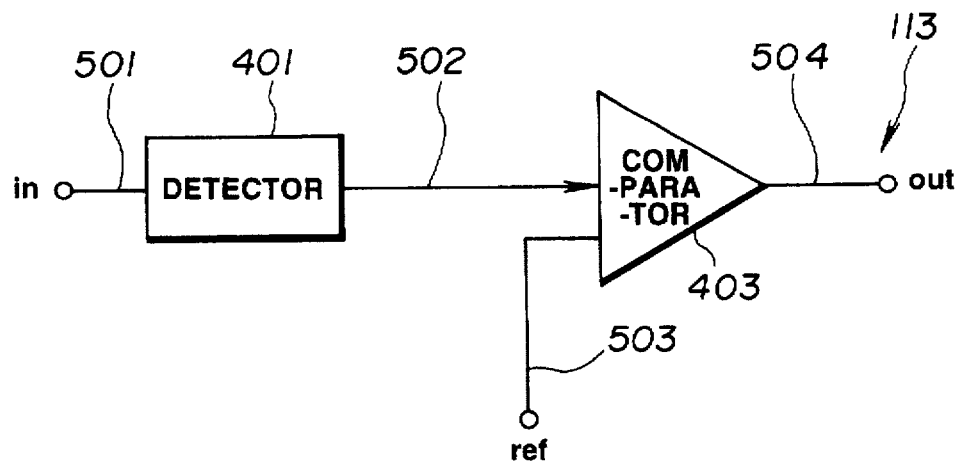
FIG. 2 is a diagram illustrating the configuration of the unrecorded-portion detection circuit shown in FIG. 1.
Figure 3:
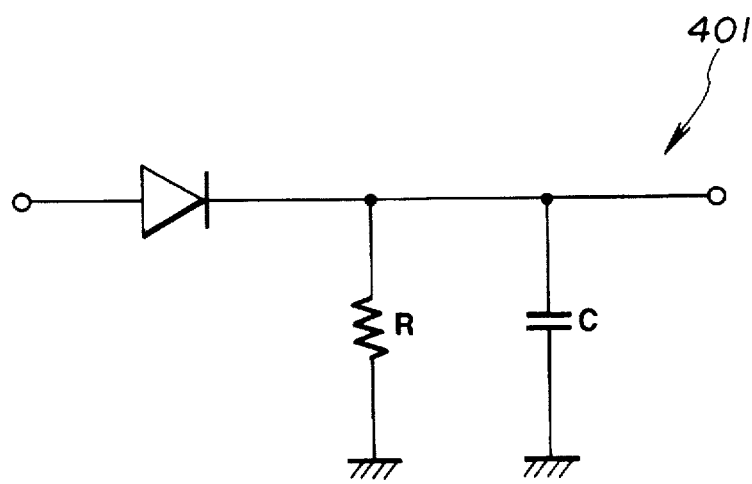
FIG. 3 is a diagram illustrating an equivalent circuit of the detector shown in FIG. 2.
Figure 4:
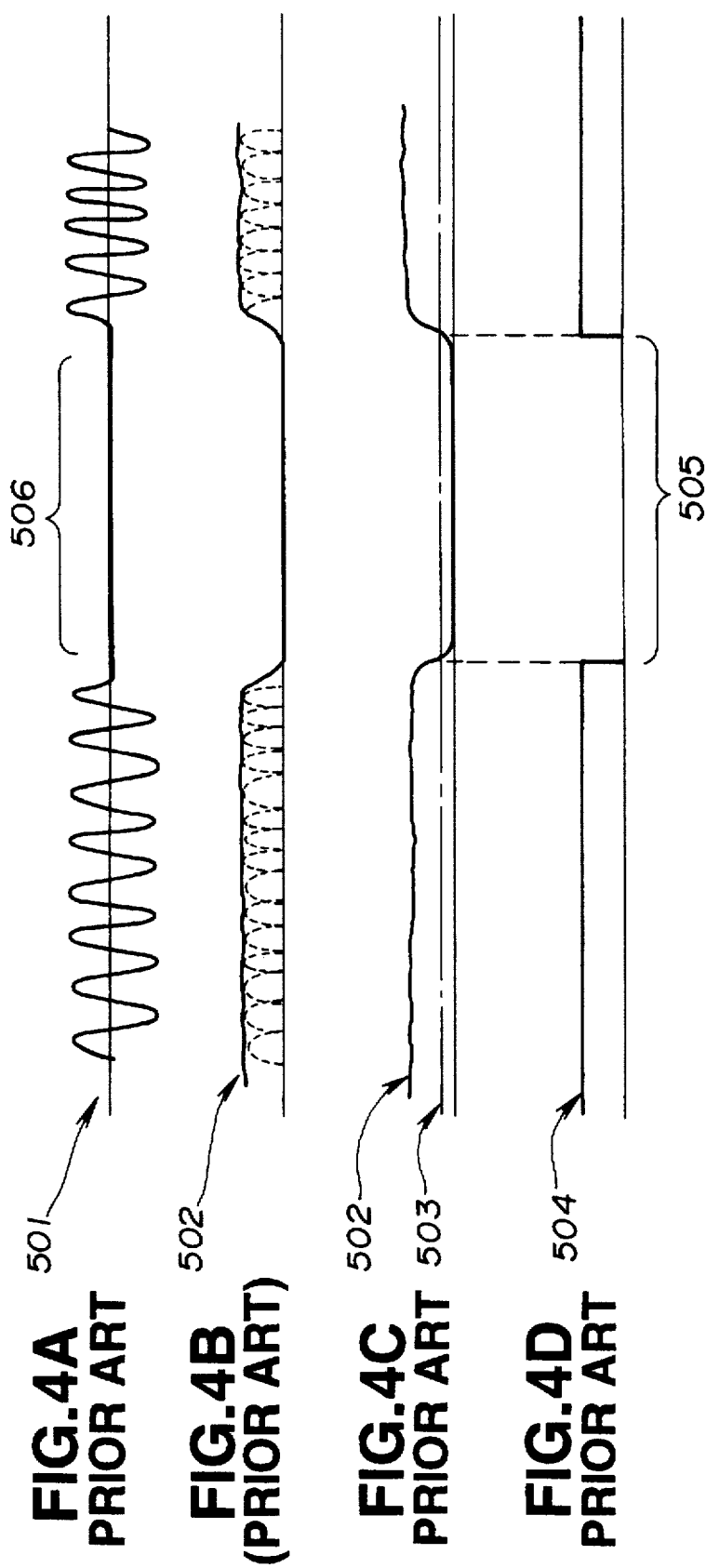
FIGS. 4A–4D are diagrams illustrating the operation of the circuit shown in FIG. 2.
Figure 5:
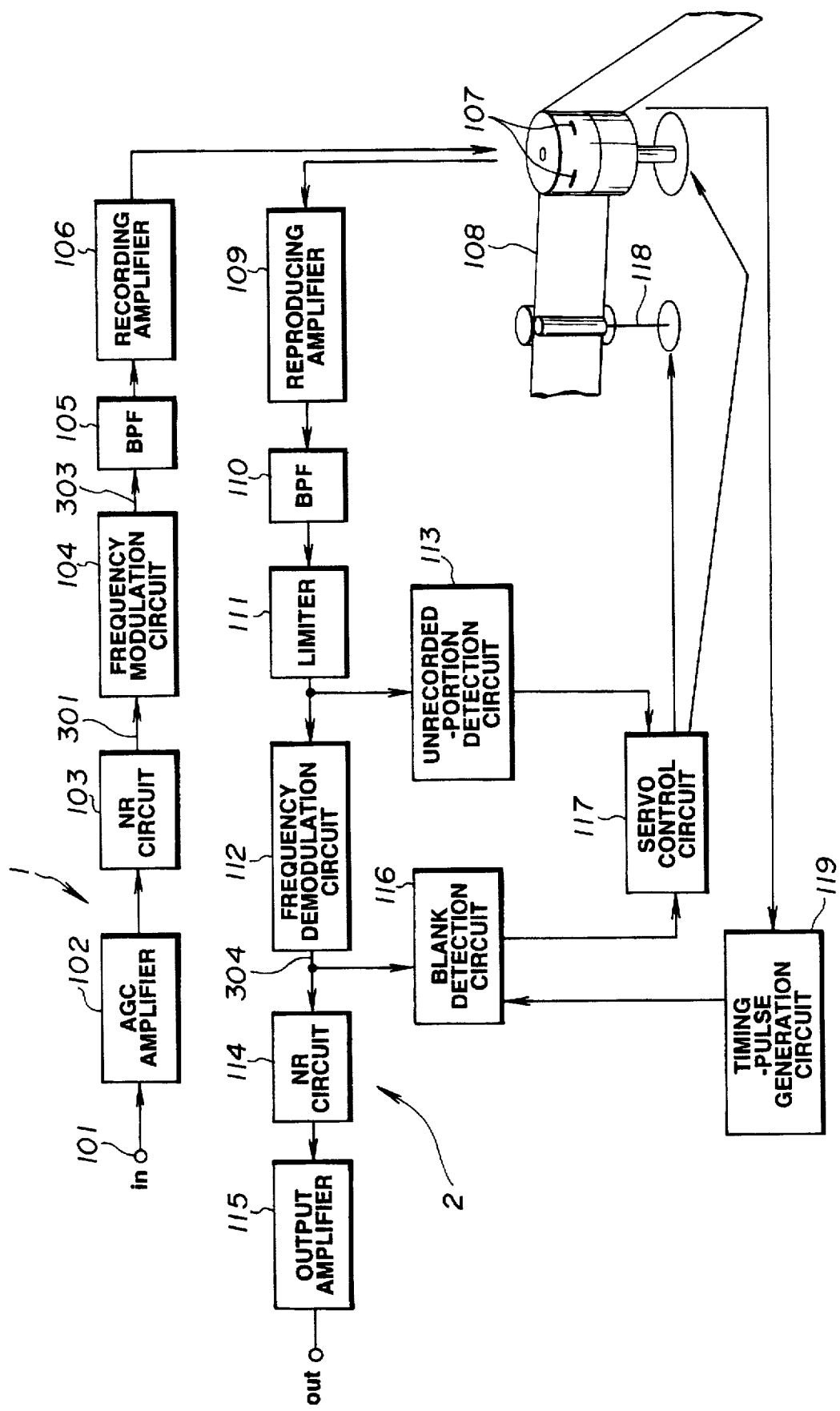
FIG. 5 is a block diagram illustrating the configuration of a VCR according to an embodiment of the present invention.

FIG. 5 is a block diagram illustrating the configuration of a VCR according to the preferred embodiment, and structure similar to that shown in FIG. 1 is designated with the same reference numeral.

In the present embodiment, as shown in FIG. 5, a description will be provided of a case in which an audio signal input to an input terminal 101 is frequency modulated by a recording system 1 and is recorded on a magnetic tape 108 by a magnetic head 107, and a signal output from the magnetic head 107 is frequency demodulated by a reproducing system 2.

The recording system 1 includes an AGC amplifier 102, an NR circuit 103, a frequency modulation circuit 104, a BPF 105 and a recording amplifier 106.

The reproducing system 2 includes a reproducing amplifier 109, a BPF 110, a limiter 111, a frequency demodulation circuit 112, an unrecorded-portion detection circuit 113, an NR circuit 114, an output amplifier 115, a blank detection circuit 116 and a servo control circuit 117.

Figure 6:
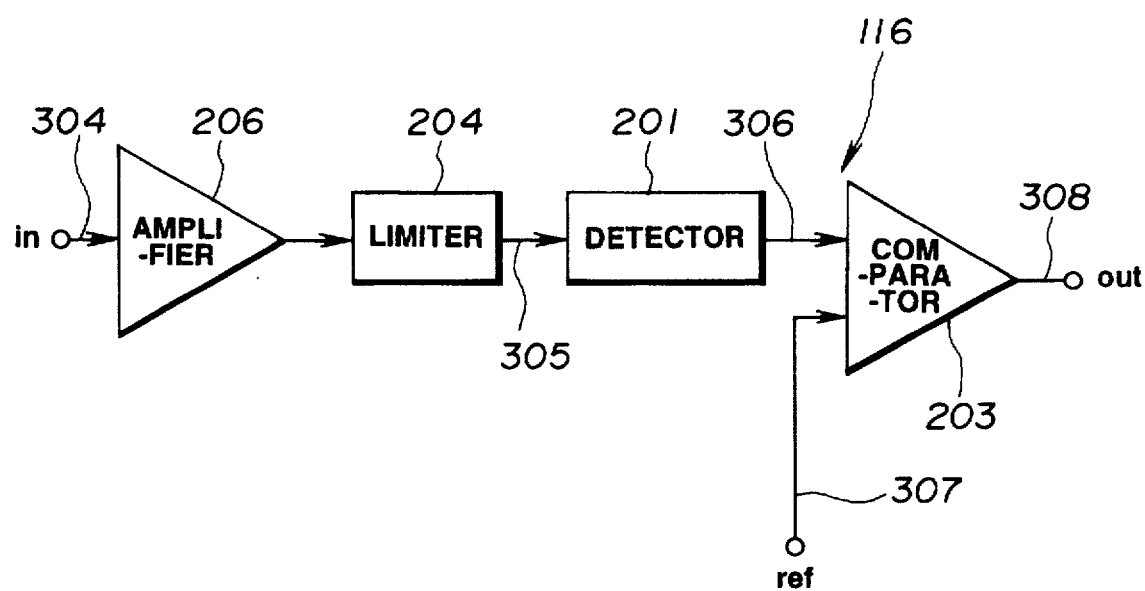
FIG. 6 is a diagram illustrating the configuration of the blank detection circuit shown in FIG. 5.
Figure 7:
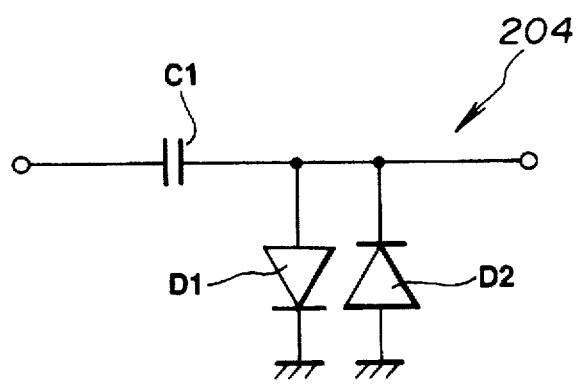
FIG. 7 is a diagram illustrating an equivalent circuit of the limiter shown in FIG. 6.
Figure 8:
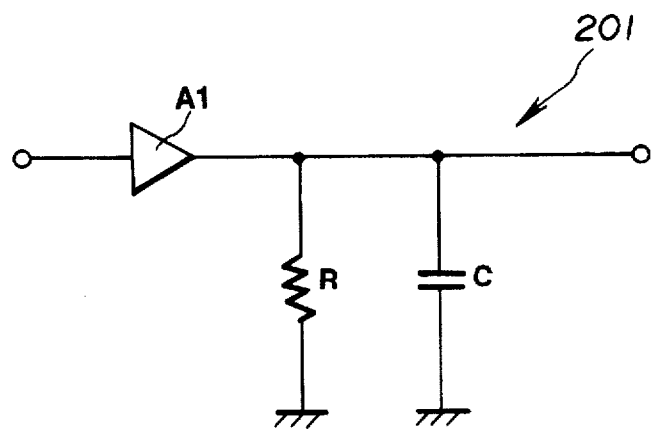
FIG. 8 is a diagram illustrating an equivalent circuit of the detector shown in FIG. 6.

As shown in FIG. 6, the blank detection circuit 116 includes an amplifier 206, a limiter 204, a detector 201 and a comparator 203. The blank detection circuit 116 detects a silent portion (a blank portion) in a reproduced signal after frequency demodulation according to procedures which will be described later, and supplies the servo control circuit 117 and the like with the result of the detection as a control signal for a tape running operation and the like. The amplifier 206 amplifies the supplied signal (for example, with a gain of 20 dB) in order to improve detection accuracy for a silent portion. The limiter 204 comprises, for example, circuitry shown in FIG. 7, and limits the amplitude of the output of the amplifier 206 using capacitor C1 and diodes D1, D2. The detector 201 comprises, for example, circuitry shown in FIG. 8 and includes amplifier A1, resistor R, and capacitor C. Since an object to be detected is a baseband, the time constant of the circuitry determined by the values of R and C is set, for example, to 1000 multiples of the value when detecting an unrecorded portion, for example, with values of R=100 kΩ and C=0.1 μF. The comparator 203 compares the input signal with a reference voltage, and outputs "1" if the input signal is greater than the reference voltage, and outputs "0" if the input signal is smaller than the reference voltage. The reference voltage before expansion by the NR circuit 114 is set, for example, to a value close to a reference level (=−25 dB)+the gain of the amplifier (=20 dB)=−5 dB.

As in the earlier-described conventional approach, the unrecorded-portion detection circuit 113 detects an unrecorded or missing portion of the recorded signal in a reproduced signal before frequency demodulation. A detection signal from the unrecorded-portion detection circuit 113 is input to the servo control circuit 117 and the like.

Next, a description will be provided of the operation of the blank detection circuit 116 in the present embodiment, also with reference to FIGS. 9A–9G which illustrate the waveforms of signals at the respective units shown in FIGS. 5 and 6.

Figure 9A:
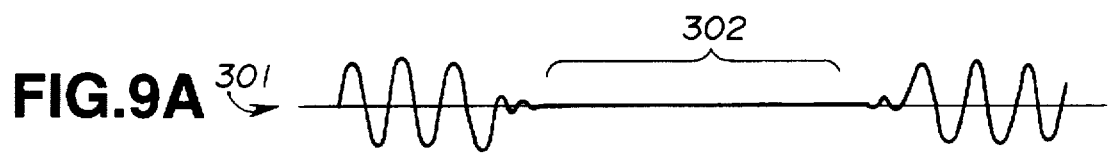
FIGS. 9A–9G illustrate waveforms for explaining the operation of the apparatus shown in FIG. 5.
Figure 9B:
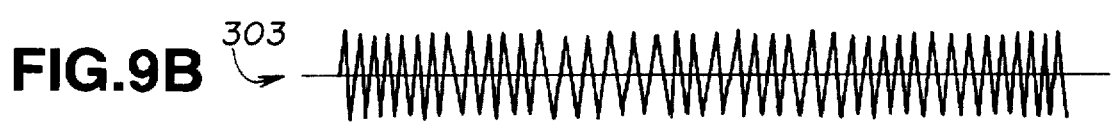

First, a description will be provided of a case of recording an audio signal. An audio signal input to the input terminal 101 passes through the AGC amplifier 102, is then subjected to compression of the dynamic range by the NR circuit 103, and is input to the frequency modulation circuit 104. For example, as shown in FIG. 9A, suppose that a signal 301 input to the frequency modulation circuit 104 includes a silent (blank) portion during a period 302. The signal 301 is frequency modulated by the frequency modulation circuit 104 to become an FM (frequency modulated) wave 303. The FM wave 303 passes through the BPF 105 and the recording amplifier 106, and is recorded on the magnetic tape 108 by the magnetic head 107.

Figure 9C:
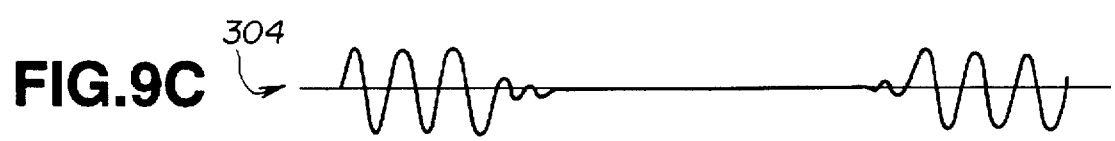
Figure 9D:
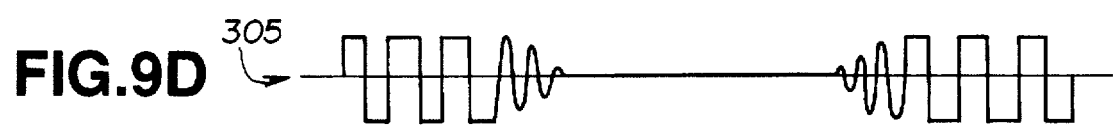
Figure 9E:
Figure 9F:
Figure 9G:
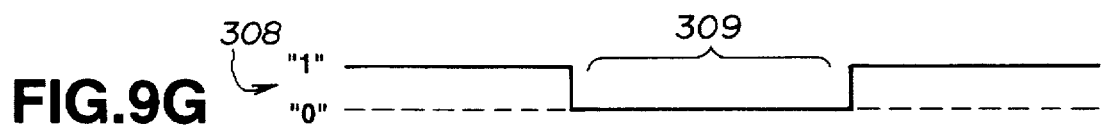

Next, a description will be provided of a case in which a signal recorded in the above-described manner is reproduced and a silent portion in the signal is detected. A signal output from the magnetic head 107 passes through the reproducing amplifier 109, the BPF 110 and the limiter 111, and is transmitted to the frequency demodulation circuit 112 and to the unrecorded-portion detection circuit 113. The signal demodulated into a baseband by the frequency demodulation circuit 112 becomes an audio signal 304 (FIG. 9C). The dynamic range of the audio signal 304 is expanded by the NR circuit 114, and the resultant signal is output via the amplifier 115. The audio signal 304 is also transmitted to the blank detection circuit 116. In the blank detection circuit 116, the audio signal 304 is first amplified by the amplifier 206, then passes through the limiter 204, and is input to the detector 201. The signal 305 (FIG. 9D) input to the detector 201 is detected by the detector 201 to become a signal 306 (indicated by solid lines in FIGS. 9E and 9F). The signal 306 is compared with a reference voltage 307 (FIG. 9F) by the comparator 203, where a comparison output signal (detection signal) 308 is obtained (FIG. 9G). A period 309, in which the value of the comparison output signal 308 equals "0" in FIG. 9G, corresponds to the silent portion (blank portion) 302 of the audio signal. The servo control device 117 performs, for example, control of stopping the magnetic tape 108 (as will be described later) by controlling a capstan 118 with the timing of the period 309, based on the comparison output signal 308 from the comparator 203.

As described above, according to the present embodiment, it is possible to detect a silent portion in the audio signal which could not previously have been detected by a detection output of the FM wave 303. That is, when a silent (blank) portion has been recorded, for example, by erroneous recording due to a misoperation of the user, it is possible to detect the blank portion, and to automatically search for that portion after recording and again to record a signal on that portion.

Next, a description will be provided of automatic detection of such a blank portion.

In the present embodiment, a blank portion is automatically detected while performing a so-called searching operation by feeding the tape 108 at a speed higher than in a usual reproducing operation. In this case, as shown in FIGS. 10A–10D, since the locus 702 of the magnetic head 107 crosses a plurality of tracks 701 recorded on the magnetic tape 108 (FIG. 10A), an undulation is produced in the envelope of the reproduced signal 703 (FIG. 10B). In a signal 704 (FIG. 10C) obtained by demodulating the reproduced signal 703, exact demodulation cannot be performed at portions where the envelope of the reproduced signal 703 has small values. In order to overcome such a problem, in the present embodiment, a blank-detecting operation is performed only during periods in which the value of timing pulses 705 equals "1" (FIG. 10D).

In the apparatus shown in FIG. 5, when automatic detection of blank portions has been commanded from an operation unit (not shown), a searching operation is performed in the above-described manner. As shown in FIGS. 11A–11D, if a frequency demodulated signal 706 (FIG. 11A) is obtained, the blank detection circuit 116 performs blank detection for portions where the value of timing pulses 707 (FIG. 11B) generated by a timing-pulse generation circuit 119 equals "1", and a signal 708 (FIG. 11C) is obtained as a result of the detection. By holding the signal 708 for a time period 710 from the fall timing of each pulse, a signal 709 (FIG. 11D) is obtained as a final result of detection. A period 712 is output to the servo control circuit 117 as a blank portion. Upon detection of the blank portion in the signal output from the blank detection circuit 116, the servo control circuit 117 stops the feeding of the magnetic tape 108, and awaits the instruction of a next operation (recording, reproducing or the like).

Figure 12:
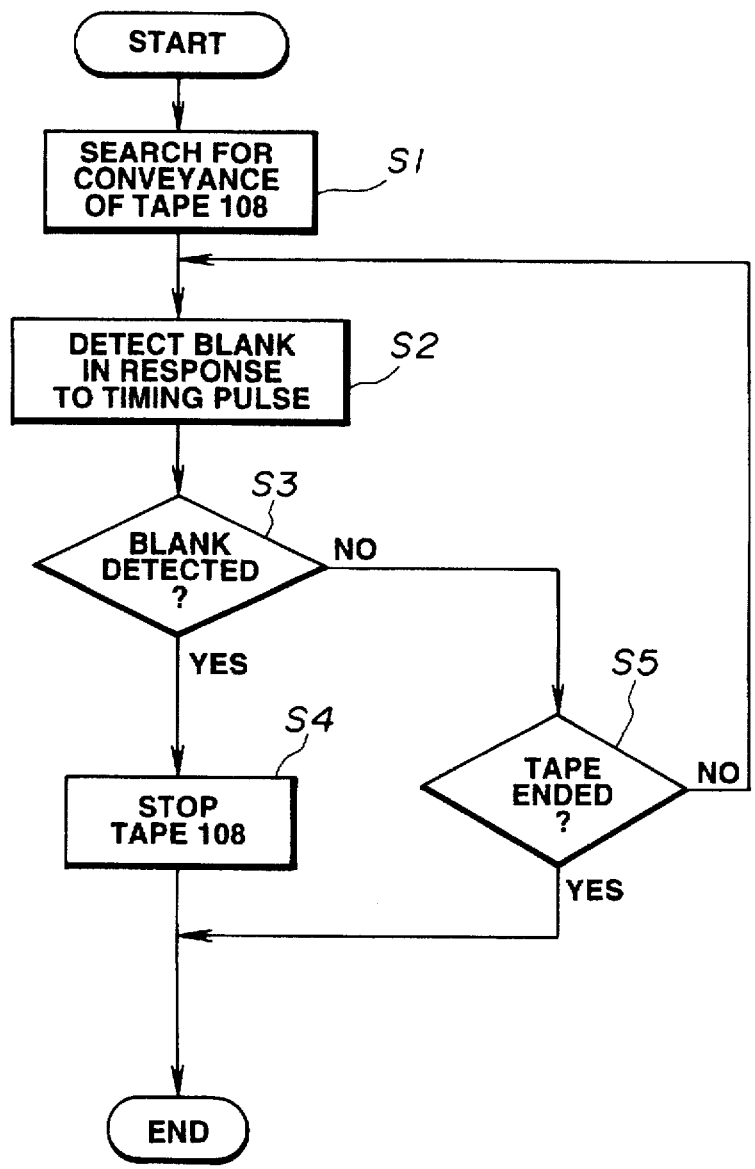
FIG. 12 is a flowchart illustrating the operation of the apparatus shown in FIG. 5.

FIG. 12 is a flowchart illustrating the above-described series of operations. In step S1, it is detected if the tape 108 is being conveyed by the tape transporting apparatus. In step S2, a blank in the tape is detected in response to the timing pulse. In step S3, it is determined whether or not a blank has been detected. If a blank has been detected, step S4 stops the tape 108. If, however, a blank has not been detected in step S3, then it is determined in step S5 whether the tape transport has ended. If the tape transport has ended, the process proceeds to the end. If, however, the tape transport has not ended in step S5, the process returns to step S2 for detection of the blank in response to the timing pulse.

Figure 13A:
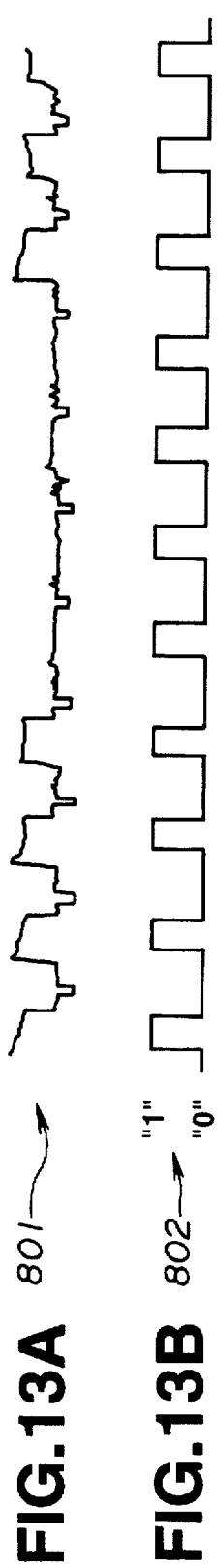

Various modifications may be performed within the scope of the present invention in addition to the above-described embodiment. For example, the same blank detection as in the above-described embodiment may be performed at an output stage of the NR circuit 114 shown in FIG. 5. In this case, since the detection is performed after expanding the signal by the NR circuit 114, the reference voltage is set, for example, to a reference level (=−50 dB)+the gain of the amplifier (=20 dB)=−30 dB. In the above-described embodiment, a description has been provided of blank detection of an audio signal. In the case of blank detection in a video signal (detection of a dark picture frame, i.e., a black portion), as shown in FIGS. 13A–13B, the above-described blank detection may be performed for a video signal 801 (FIG. 13A) obtained by frequency demodulating a reproduced video signal in a searching operation during periods in which the value of timing pulses 802 (FIG. 13B) equals "1". If the user performs a misoperation (for example, recording of an image without removing the cap of the camera), the corresponding portion is recorded as a black image. According to the above-described approach, however, it is possible to automatically search for that portion and to record again an image on that portion. Although in the above-described embodiment, a blank portion is detected while performing a searching operation, the blank portion may be detected during a usual reproducing operation.

As described above in detail, according to the present embodiments, it is possible to detect a silent portion and/or a black image portion, serving as a blank portion, in an input signal. Hence, when a blank portion has been erroneously recorded, a recording operation can be started again from that blank portion.

The individual components shown in outline or designated by blocks in the drawings are all well known in the recording/reproducing apparatus arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A signal reproducing apparatus, comprising:

reproducing means for reproducing a frequency-modulated image signal from a recording medium, said reproducing means including transporting means for transporting the recording medium;

demodulation means for frequency demodulating the reproduced signal;

detection means for detecting a predetermined portion, representing a predetermined image, in the demodulated image signal and outputting a detection signal, said detection means including discrimination means for discriminating a level of the demodulated image signal demodulated by said demodulation means, said detection means detecting the predetermined portion according to the discrimination result of said discrimination means; and control means for controlling said transporting means according to the detection signal.

2. An apparatus according to claim 1, wherein said detection means comprises detecting means for detecting an envelope of the signal demodulated by said demodulation means, said detection means detecting a black portion in the reproduced signal in accordance with a result of the detection by said detecting means.

3. An apparatus according to claim 2, wherein said detection means detects a portion of the signal demodulated by said demodulation means whose envelope level is as low as the black portion.

4. An apparatus according to claim 1, wherein the reproduced signal comprises a video signal and an audio signal.

5. An apparatus according to claim 1, further comprising:
   dropout detection means for detecting a dropout portion in the reproduced signal by detecting a level of the signal input to said demodulation means.

6. An apparatus according to claim 1, wherein said reproducing means comprises a head for reproducing the signal from the medium, and wherein said control means controls said transporting means so as to stop the transporting of the recording medium in response to the detection signal.

7. An apparatus according to claim 1, further comprising:
   recording means for recording an input signal on the recording medium while frequency modulating the input signal.

8. A signal reproducing apparatus, comprising:
   reproducing means for reproducing a frequency modulated signal from a recording medium, said reproducing means including transporting means for transporting the recording medium;
   demodulation means for frequency demodulating the reproduced signal;
   timing-signal generation means for generating a timing signal corresponding to a recording medium transporting speed of said transporting means;
   detection means for detecting a level of the demodulated signal demodulated by said demodulation means to output a detection signal in response to the timing signal; and
   control means for controlling said transporting means in accordance with the detection signal.

9. An apparatus according to claim 8, wherein said timing-signal generation means generates the timing signal so that said detection means operates for portions where the signal input to said demodulation means has at least a predetermined level.

10. An apparatus according to claim 8, wherein said control means controls said transporting means so as to stop the transporting of the recording medium when the level of the signal demodulated by said demodulation means is equal to or less than a predetermined level.

11. A signal reproducing apparatus, comprising:
    feeding means for feeding a recording medium;
    reproducing means for reproducing a frequency-modulated audio signal from the recording medium;
    demodulation means for demodulating the reproduced audio signal;
    detection means for detecting a predetermined portion, representing a predetermined sound, in the demodulated image signal and outputting a detection signal, said detection means including discrimination means for discriminating a level of the demodulated audio signal demodulated by said demodulation means, said detection means detecting the predetermined portion according to the discrimination result of said discrimination means; and
    control means for controlling said feeding means in accordance with an output from said detection means.

12. An apparatus according to claim 1, further comprising timing signal generation means for generating a timing signal corresponding to a recording medium transporting speed of said transporting means, said detection means operating in response to the timing signal.

13. An apparatus according to claim 12, wherein said reproducing means includes a rotary head for tracing a recording medium on which the frequency-modulated signal is recorded, and wherein said timing signal generating means generates the timing signal by using a signal indicating a rotary phase of the rotary head.

14. A signal reproducing apparatus, comprising:
    reproducing means for reproducing a frequency-modulated signal from a recording medium by using a rotary head, said reproducing means including transporting means for transporting the recording medium;
    a demodulator for frequency demodulating the reproduced signal;
    a timing signal generator for generating a timing signal by using a signal indicating a rotary phase of the rotary head;
    a detector for detecting a blank portion in the reproduced signal to output a detection signal by using a signal demodulated by the demodulator in response to the timing signal; and
    a controller for controlling said reproducing means according to the detection signal.

15. Apparatus according to claim 14, wherein the timing signal generator generates the timing signal corresponding to a recording medium transporting speed of said transporting means.

16. Apparatus according to claim 14, wherein said detector comprises detecting means for detecting an envelope of the signal demodulated by said demodulator, said detector detecting the blank portion in the reproduced signal in accordance with a result of the detection by said detecting means.

17. Apparatus according to claim 16, wherein said detector detects a portion of the signal demodulated by said demodulator whose envelope level is as low as the blank portion.

18. Apparatus according to claim 14, wherein the reproduced signal comprises a video signal and an audio signal.

19. Apparatus according to claim 1, wherein said reproducing means includes a rotary head for tracing the recording medium, and wherein said detection means detects the level of the demodulated signal by using a signal indicating a rotary phase of the rotary head.

20. An apparatus according to claim 11, further comprising dropout detection means for detecting a dropout portion in the reproduced audio signal by using the frequency modulated audio signal to be input to said demodulation means.

21. An apparatus according to claim 11, wherein said detection means includes filtering means for filtering the demodulated audio signal, said discrimination means discriminating the level of the demodulated audio signal output from said filtering means.

22. An apparatus according to claim 11, wherein said reproducing means includes a rotary head for tracing the recording medium, and wherein said detection means includes generation means for generating a timing signal by using a signal indicating a phase of the rotary head.

23. An apparatus according to claim 22, wherein said detection means operates in response to the timing signal.

* * * * *